US009250320B2

(12) United States Patent
Watson et al.

(10) Patent No.: US 9,250,320 B2
(45) Date of Patent: Feb. 2, 2016

(54) HARMONIZING CODE FROM INDEPENDENT AIRBORNE AIRCRAFT IDENTIFICATION SYSTEMS

(71) Applicant: L-3 Communications Avionics Systems, inc., Grand Rapids, MI (US)

(72) Inventors: Gary S. Watson, Ada, MI (US); Lee R. Carlson, Grand Rapids, MI (US); Blake R. Getson, Columbus, OH (US); Matthew J. Bundy, Galloway, OH (US); James R. Troxel, Glendale, AZ (US)

(73) Assignee: L-3 Communications Avionics Systems, Inc., Grand Rapids, MI (US)

( * ) Notice: Subject to any disclaimer, the term of this patent is extended or adjusted under 35 U.S.C. 154(b) by 243 days.

(21) Appl. No.: 13/892,641

(22) Filed: May 13, 2013

(65) Prior Publication Data

US 2013/0307717 A1    Nov. 21, 2013

Related U.S. Application Data

(60) Provisional application No. 61/647,068, filed on May 15, 2012, provisional application No. 61/683,854, filed on Aug. 16, 2012.

(51) Int. Cl.
*G01S 13/82* (2006.01)
*G01S 13/91* (2006.01)
*G01S 13/93* (2006.01)
*G01S 13/78* (2006.01)

(52) U.S. Cl.
CPC ............ *G01S 13/825* (2013.01); *G01S 13/784* (2013.01); *G01S 13/91* (2013.01); *G01S 13/9303* (2013.01)

(58) Field of Classification Search
CPC ..... G01S 13/784; G01S 13/825; G01S 13/91; G01S 13/9303
USPC .......................................................... 342/37
See application file for complete search history.

(56) References Cited

U.S. PATENT DOCUMENTS

| 5,077,673 A | 12/1991 | Brodegard et al. |
| 5,532,698 A | 7/1996 | Nielsen et al. |
| 6,885,340 B2 | 4/2005 | Smith et al. |

(Continued)

OTHER PUBLICATIONS

International Preliminary Report on Patentability from Patent Cooperation Treaty Patent Application No. PCT/US2011/042206 mailed Jan. 17, 2013.

*Primary Examiner* — Timothy A Brainard
(74) *Attorney, Agent, or Firm* — Gardner, Linn, Burkhart & Flory, LLP (57) ABSTRACT

An Automatic Dependent Surveillance-Broadcast (ADS-B) system, and method of harmonizing a transponder Squawk code and an ADS-B system, ensures that a Squawk code broadcast by the ADS-B system matches the transponder Squawk code. The transponder Squawk code is transmitted from a transponder positioned onboard an aircraft and the transmitted transponder Squawk code with a device positioned onboard the aircraft. A Squawk code input of an ADS-B Squawk code to be transmitted with the ADS-B system is received. The ADS-B Squawk code is compared with the received transmitter Squawk code using a comparator and the pilot is informed whether the transmitter Squawk code matches the ADS-B Squawk code. A message formatter generates a message that includes the ADS-B Squawk code. A wireless transmitter broadcasts the ADS-B Squawk code generated by the message formatter.

36 Claims, 5 Drawing Sheets

(56) References Cited

U.S. PATENT DOCUMENTS

| | | |
|---|---|---|
| 7,132,982 B2 | 11/2006 | Smith et al. |
| 7,256,728 B1 | 8/2007 | Kenny et al. |
| 7,383,124 B1 * | 6/2008 | Vesel .................. G01S 13/765 340/945 |
| 7,535,405 B2 | 5/2009 | Hunter |
| 7,706,979 B1 * | 4/2010 | Herwitz ....................... 701/301 |
| 8,102,301 B2 * | 1/2012 | Mosher ................. G01S 13/782 342/30 |
| 8,102,302 B2 | 1/2012 | Alon |
| 2005/0187677 A1 | 8/2005 | Walker |
| 2007/0132638 A1 | 6/2007 | Frazier et al. |
| 2012/0001788 A1 * | 1/2012 | Carlson et al. .................. 342/30 |
| 2012/0038501 A1 | 2/2012 | Schulte et al. |
| 2013/0009823 A1 | 1/2013 | Wang |

* cited by examiner

HARMONIZING CODE FROM INDEPENDENT AIRBORNE AIRCRAFT IDENTIFICATION SYSTEMS

CROSS REFERENCE TO RELATED APPLICATIONS

This application claims priority from U.S. provisional patent application Ser. No. 61/647,068, filed on May 15, 2012, and U.S. provisional patent application Ser. No. 61/683,854, filed on Aug. 16, 2012 the disclosures of which are hereby incorporated herein by reference in their entirety.

BACKGROUND OF THE INVENTION

The present invention relates to aircraft communication systems and, more particularly, to aircraft communication systems that provide identifying information about an aircraft, such as, but not limited to, transponders and Automatic Dependent Surveillance-Broadcast (ADS-B) systems.

The United States Federal Aviation Administration (FAA) has current plans to require that all aircraft include an Automatic Dependent Surveillance-Broadcast (ADS-B) system onboard by 2020. ADS-B systems are systems in which an aircraft repetitively broadcasts information about itself to both the air traffic control (ATC) system and any other aircraft within the vicinity of the broadcasting aircraft. The broadcast information includes, among other items, the aircraft's three-dimensional position and velocity, as well as an air traffic control assigned transponder code, also known as a Squawk code. In some instances, an aircraft equipped with the ADS-B system may also have an air traffic control radar beacon system (ATCRBS), which is a mode A/C transponder, onboard the aircraft. As is known in the art, the mode A/C transponder responds to certain interrogations by broadcasting a Squawk code that is received by air traffic control. Confusion at air traffic control may result if the mode A/C transponder Squawk code does not match the Squawk code broadcast by the ADS-B system from the same aircraft. The terms Squawk code and mode A Squawk code are used interchangeably throughout this document, but are intended to refer to the same code.

SUMMARY OF THE INVENTION

According to its various embodiments, the present invention provides methods and systems for ensuring that the aircraft identifying information, such as the Squawk code, broadcast by a transponder, such as an ATCRBS transponder, matches the aircraft identifying information broadcast by the ADS-B system. In other words, the various embodiments provides methods and systems for ensuring that an aircraft will not inadvertently broadcast different or multiple identification information through its transponder and its ADS-B system.

An Automatic Dependent Surveillance-Broadcast (ADS-B) system, and method of harmonizing a transponder Squawk code and an ADS-B system, according to an aspect of the invention, ensures that a Squawk code broadcast by the ADS-B system matches the transponder Squawk code. The transponder Squawk code is transmitted from a transponder positioned onboard an aircraft and the transmitted transponder Squawk code is received with a device positioned onboard the aircraft. A squawk code input of an ADS-B Squawk code to be transmitted with the ADS-B system is received. The ADS-B Squawk code is compared with the received transponder Squawk code using a comparator, and the pilot is informed whether the transponder Squawk code matches the ADS-B Squawk code. A message formatter generates a message that includes the ADS-B Squawk code. A wireless transmitter broadcasts the ADS-B Squawk code generated by the message formatter.

The squawk code input may be provided by a pilot entering the code with a pilot input device. Alternatively, a sync control may be provided that is adapted to cause the Squawk code input to set the ADS-B Squawk code to the value of the transponder Squawk code if the comparator determines that the transponder Squawk code and the ADS-B Squawk code are not the same. If a sync control is used, the Squawk code input may be a default ADS-B Squawk code value that is assumed upon system power-up.

The transponder decoder may receive the Squawk code wirelessly from the transponder. The transponder decoder may also receive altitude information broadcast from the transponder and forward the altitude information to the comparator for comparing the altitude information broadcast from the transponder to altitude information received from another source of altitude information.

The message formatter may be adapted to determine that a transponder transmission is a Squawk code, such as by determining that the transponder transmission has a value that is not the same value as altitude information for the aircraft. The message formatter may be adapted to take an alternative action if it cannot determine that the transponder transmission is a Squawk code. The alternative action may be to provide an indication to the pilot. The alternative action may be to send an interrogation signal to activate said transponder to send a Squawk code. The wireless transmitter may be used to send the interrogation signal to said transponder.

The ADS-B device may be adapted to send an interrogation signal to activate the transponder to send a Squawk code. The wireless transmitter may be used to send the interrogation signal to said transponder. The message formatter may be adapted to determine that the transponder is not transmitting. The message formatter may be adapted to distinguish between the transponder not transmitting because i) the transponder is not operational or ii) the transponder is not being interrogated.

A transponder suppression bus input may be coupled to a transponder suppression bus to receive a signal to help differentiate between data transmitted by the transponder onboard the aircraft and data transmitted by any transponders offboard the aircraft. The transponder decoder may also receive IDENT information broadcast from the transponder and forward the IDENT information to the message formatter for formatting into the message.

The wireless transmitter may be a component of a Universal Access Transceiver (UAT).

These and other objects, advantages and features of this invention will become apparent upon review of the following specification in conjunction with the drawings.

DESCRIPTION OF THE EMBODIMENTS

Figure 1:
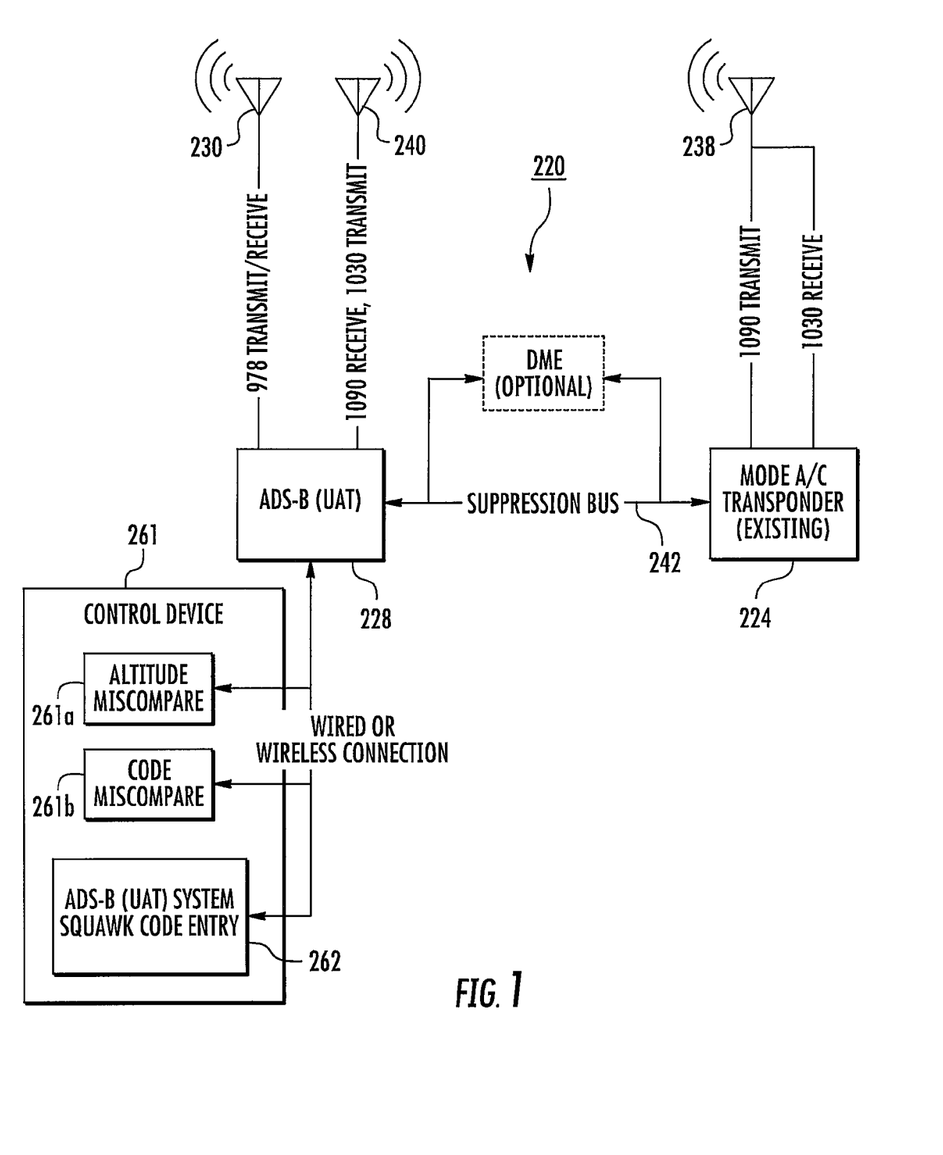
FIG. 1 is a block diagram of an ADS-B system, according to an embodiment of the invention.

Referring now to the drawings and the illustrative embodiments depicted therein, an Automatic Dependent Surveillance-Broadcast (ADS-B) system 220 for an aircraft is useful with a mode A/mode C transponder 224 having a transponder antenna 238 (FIG. 1). System 220 includes an ADS-B device 228 having a UAT transmitter and a low power transceiver antenna 240 that can output a mode A interrogation message directly to transponder 224. As disclosed in commonly assigned U.S. Patent Application Publication No. 2012/001788 A1, the disclosure of which is hereby incorporated herein by reference, such interrogation may be used wherever the transmission from transponder 224 equals the altitude information from the aircraft or ADS-B system 220 is otherwise unable to unambiguously determine the Squawk code. Since transceiver antenna 240 sends a mode A interrogation message, it can conclude that the transmission from transponder 224 is a mode A Squawk code. Transceiver antenna 240 can be separate from the UAT transceiver 230 used to transmit to the ground or to other aircraft or can be a combined transceiver that is capable of wireless communication with transponder antenna 238. If a common transceiver antenna is used, it would transmit at a lower power level to interrogate transponder 224 than would be used as a UAT transceiver mode.

System 220 includes a suppression bus 242 that is used to indicate that an L-band system onboard the aircraft is transmitting. It is used by ADS-B device 228 as a trigger to receive transmissions from transponder 224 to ensure that ADS-B device 228 is not intercepting a transponder transmission from a different aircraft. System 220 may further include a pilot control panel 261 that includes ADS-B system control device 262 that allows the pilot to manually enter a Squawk code into ADS-B device 228. Pilot control panel 261 may further include indicator 261a to advise the pilot that the input altitude reported by transponder 224 does not match that reported by ADS-B control device 228, as will be discussed in more detail below. Also, indicator 261b may be included to inform the pilot that the selected code as reported by transponder 224 does not match that entered into the ADS-B Squawk code entry device.

Figure 2:
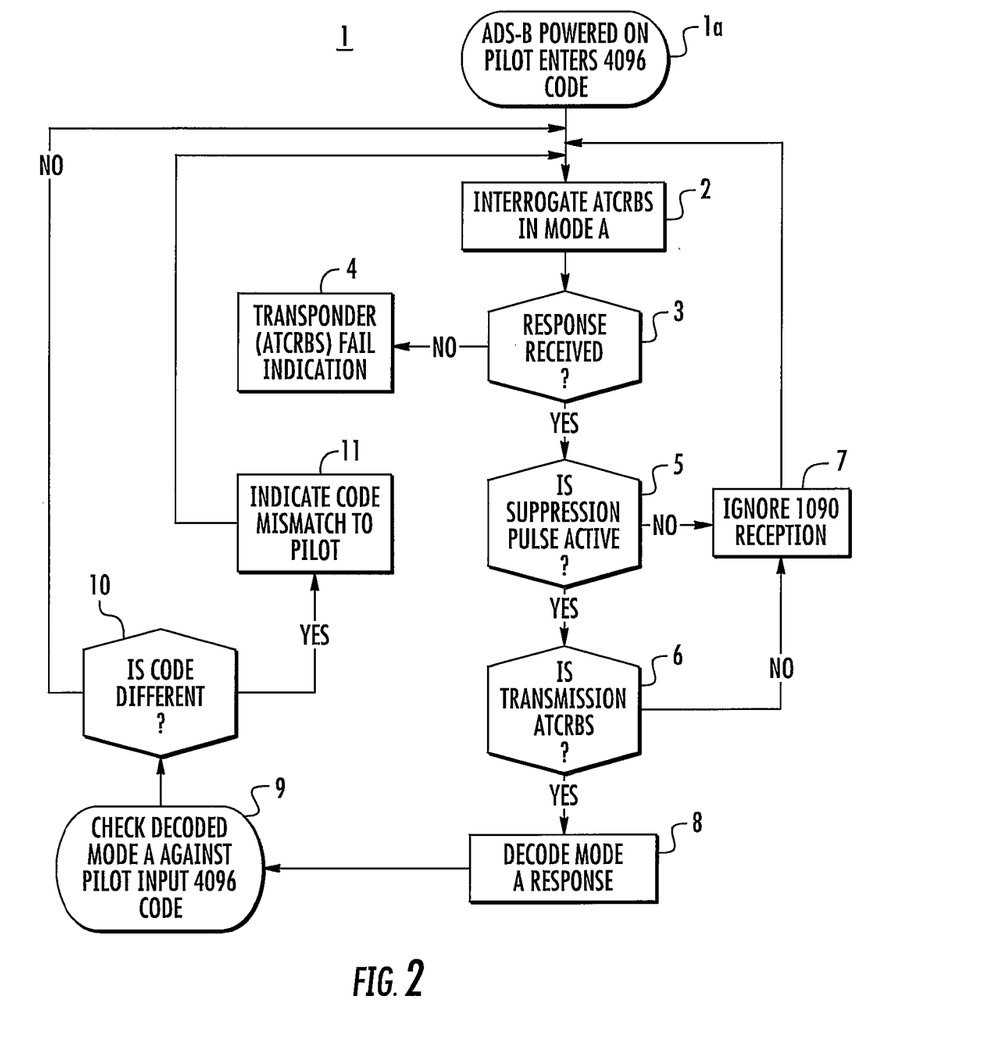
FIG. 2 is a flowchart of a method of harmonizing a transponder Squawk code and an ADS-B system such that an interrogation broadcast by the ADS-B system makes the transponder squawk.

System 220 performs a control technique 1 that is based upon the requirement that the UAT device 228 must output the same mode A code as transponder 224. Referring now to FIG. 2, control technique 1 begins at 1a with the pilot powering on and entering the squawk code in ADS-B device 228, such as with squawk code entry device 262. Transceiver antenna 240 sends a mode A interrogation message to transponder 224 at 2. Therefore, system 220 can conclude that the transmission from transponder 224 is a mode A Squawk code. When this occurs, the transponder is either off or in the standby mode or is on. If it is on, ADS-B device 228 receives a transmission from transponder 224 at 3. If it is determined at 3 that a response has not been received, then a transponder fail indication is made at 4 on an annunciator (not shown) or other visual or aural indicator. The fail indication may instruct the pilot to check that the transponder 224 is turned on.

If it is determined at 3 that a response is received from transponder 228, it is determined at 5 whether suppression bus 242 is active indicating that an L-band transmitter on the aircraft is transmitting. If so, the response originated with this aircraft. If it is determined at 5 that suppression bus 242 is not active then the response is ignored at 7. If it is determined at 5 that the suppression bus is active, it is determined at 6 whether the transmission is from transponder 224 by examining the format of the response. If it is determined at 6 that the response has the proper format for a transmission from transponder 224 then the response is decoded at 8 as a Mode A response from transponder 224. Otherwise it is ignored at 7.

The decoded Mode A response is compared with the code entered by the pilot with Squawk code entry device 262 at 9 and the result is evaluated at 10. If it is determined at 10 that the Mode A response decoded from transponder 224 is not different from the ADS-B code entered by the pilot, then no action is taken. However, if it is determined at 10 that a different code is entered in the ADS-B device than that decoded from transponder 224, an indication is made to the pilot at 11 such as by illuminating code miscompare attenuator 261b or by some other visual or aural indication.

Figure 3:
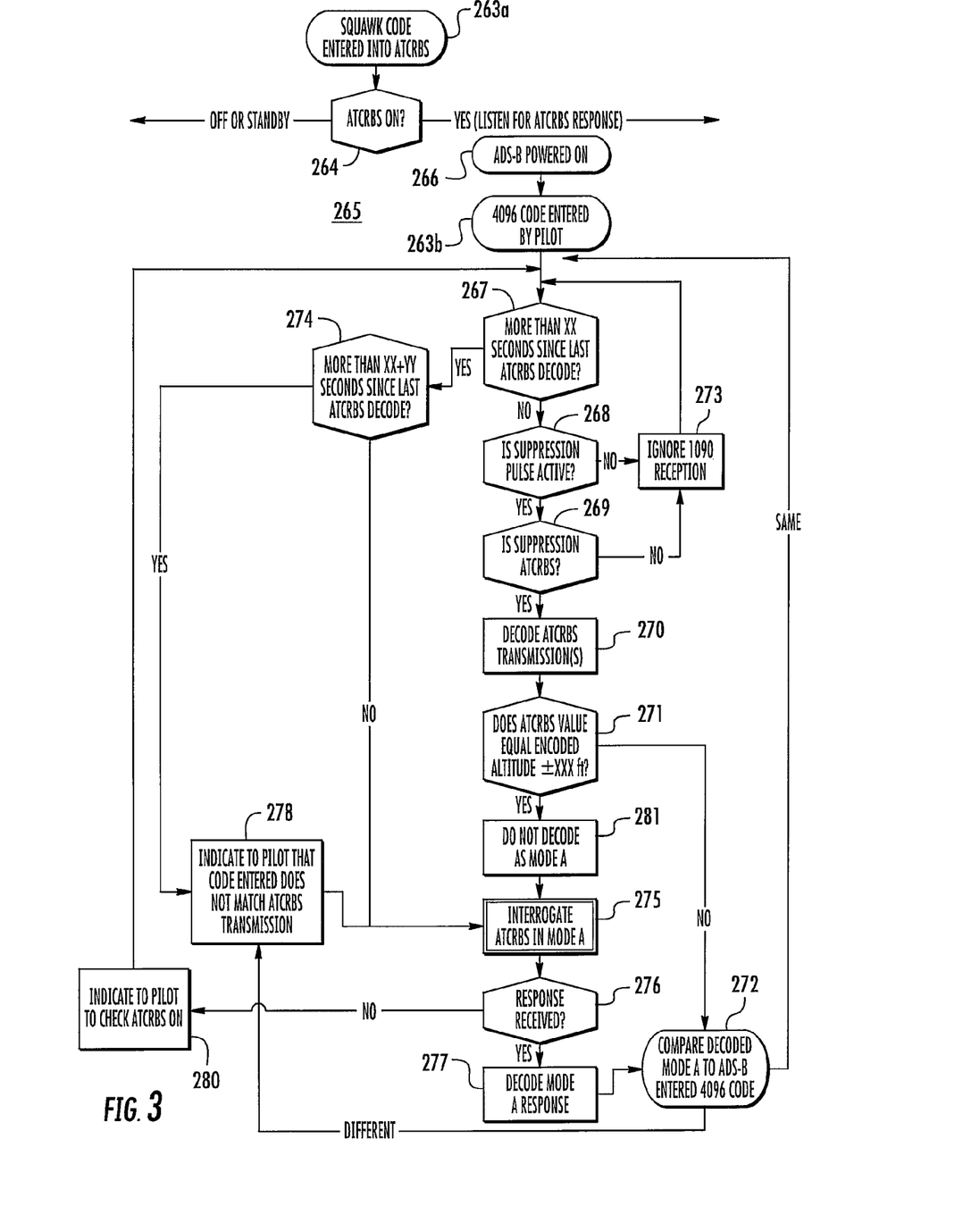
FIG. 3 is a more detailed flowchart of the method of harmonizing a transponder Squawk code and an ADS-B system such that a Squawk code broadcast by the ADS-B system matches the transponder squawk in FIG. 2.

FIG. 3 illustrates a control technique 265 for ensuring that ADS-B device 228 only transmits as a Squawk code message to the air traffic control system or other aircraft in the vicinity of a mode A Squawk code message from transponder 224 that is more detailed than that illustrated in FIG. 2. With the pilot entering a Squawk code message (263a) in transponder 224 and transponder 224 operational (264), ADS-B device 228 is also powered on at 266. The same Squawk code message that was entered in the transponder at 263a is entered in ADS-B device 228 by the pilot via entry device 262 (263b). It is determined at 267 whether more than a predetermined amount of time has passed since the last transmission has been received from transponder 224. Since transponder 224 is operational and has recently transmitted a message in response to a ground radar or from a TCAS unit onboard another aircraft, it will be determined at 267 that this predetermined time has not passed. It is then determined at 268 whether suppression line 242 is active, which will occur at least when transponder 224 is transmitting. If so, the message received by transceiver 240 is examined at 269 to determine if it has the format of a message from transponder 224. If so, the message is decoded at 270. Once the message is decoded, it is compared at 271 with the altitude information obtained by ADS-B device 228, such as from an altimeter that supplies altitude data to both transponder 224 and ADS-B device 228.

If the message decoded from transponder 224 is determined at 271 to not be the same as the altitude information, it is determined that the message must be a mode A Squawk code message so it is compared at 272 to the value of the Squawk code entered into ADS-B device 228. If these two Squawk codes are the same, this value of the Squawk code is the one to be used by ADS-B device 228 for future transmissions until it is changed by the pilot by entering a different Squawk code in transponder 224 and/or ADS-B device 228. If it is determined at 272 that these two Squawk codes are not the same, annunciator 261b is actuated to instruct the pilot at 278 that the code entered in ADS-B device 228 does not match the code entered in transponder 224. This should prompt the pilot to change one of the codes to match the other.

If it is determined at 267 that more than a predetermined period of time, such as several seconds, has passed since last receipt of a transmission from transponder 224, then transponder 224 is likely not being interrogated by a ground radar or a TCAS unit in another aircraft. If it is determined at 267 that this period has not yet passed, it is determined at 268 whether suppression line 242 is active. If so, it is determined at 269 whether the device that is transmitting is transmitting a message having a protocol of a message transmitted by transponder 224. If not, the message is ignored at 273. This sequence is repeated until it is determined at 267 that more than the predetermined amount of time has passed. It is then determined at 274 whether a longer predetermined period of time, such as tens of seconds, has lapsed.

If it is determined at 274 that a longer predetermined period of time has not lapsed, ADS-B device 228 interrogates transponder 224 by sending an attenuated signal at 275 to transponder 224 having a format of a mode A code interrogation. This is accomplished either by sending the interrogation signal with an antenna 240 dedicated to communication with transponder 224 or by a UAT antenna 230 that is used both to communicate with transponder 224, at an attenuated signal level, and to generate ADS-B UAT signals external to the aircraft. It is then determined at 276 whether a response is received. If so, then it is concluded at 277 that it is a mode A Squawk message and it is used to compare with the Squawk code set for ADS-B device at 272. In this manner, it is possible to determine that the Squawk code for ADS-B device 228 is set to the same Squawk code as transponder 224, even if the transponder is not being interrogated by a ground radar or a TCAS unit of another aircraft.

If it is determined at 267 and 274 that a response is not received within the extended predetermined period of time after interrogation of transponder 224, a message is then given to the pilot at 278, such as with annunciator 261b or other visual or aural warning indicator, instructing the pilot that the code entered with Squawk code entry device 262 does not match that entered in transponder 224 or the transponder is not operating properly or is turned off.

If it is determined at 276 that a message has not been received from transponder 224 even after having attempted to interrogate the transponder at 275, it is then concluded that the transponder is likely not turned on or has failed. An indication is given to the pilot at 280, such as using another annunciator (not shown) that the code cannot be set using control technique 265. The pilot may be instructed to turn the transponder on or to manually enter a Squawk code in ADS-B device, such as with Squawk code entry device 262, or may be optionally instructed to attempt to manually interrogate transponder 224. In this manner, it may be possible to enter a Squawk code in the ADS-B device, even if transponder 224 is powered off or has failed.

If it is determined at 267 that the lower predetermined period of time has not passed since the last transmission of transponder 224, since the transponder is being interrogated by a ground radar or a TCAS unit on another aircraft, it is determined at 268 whether suppression bus 242 is active and at 269 whether the transmission is from transponder 224. If so, the transmission is decoded at 270 and compared at 271 with the altitude data received by ADS-B device 228. If transponder 224 is set to a Squawk code that is indistinguishable from the altitude data received by ADS-B device 228, it will be determined at 281 that the transmission from transponder 224 is indistinguishable from the altitude value. As a result, the transmission from transponder 224 is not used to compare with the Squawk code in ADS-B device 228. Instead, transponder 224 is interrogated at 275 with UAT transceiver 240 at an attenuated signal level, or by separate transceiver 230. A response should be received at 276 since the transponder is presumably turned on and is not failed. Because the response is from a mode A interrogation signal, it is decoded at 277 and compared with the Squawk code set for ADS-B device 228 at 272.

Control device 261 may further include an Altitude Miscompare annunciator 261a. Both transponder 224 and ADS-B device 228 may receive altitude data from a common altitude sensor (not shown). Therefore, the altitude information received from transponder 224 should match that received directly from the altitude sensor. If it does not match, this could be an indication of a failure in operation of either transponder 224 or ADS-B device 228. Such failure, if detected by a comparison of data decoded from transponder 224 and that received from the altitude sensor, is used to illuminate Altitude Miscompare annunciator 261a or other such pilot warning technique including aural as well as visual.

While illustrated for use in ensuring that a common mode A Squawk code is used in the ADS-B device as in the transponder, the same technique could be used for mode C code signals or other types of code.

Figure 4:
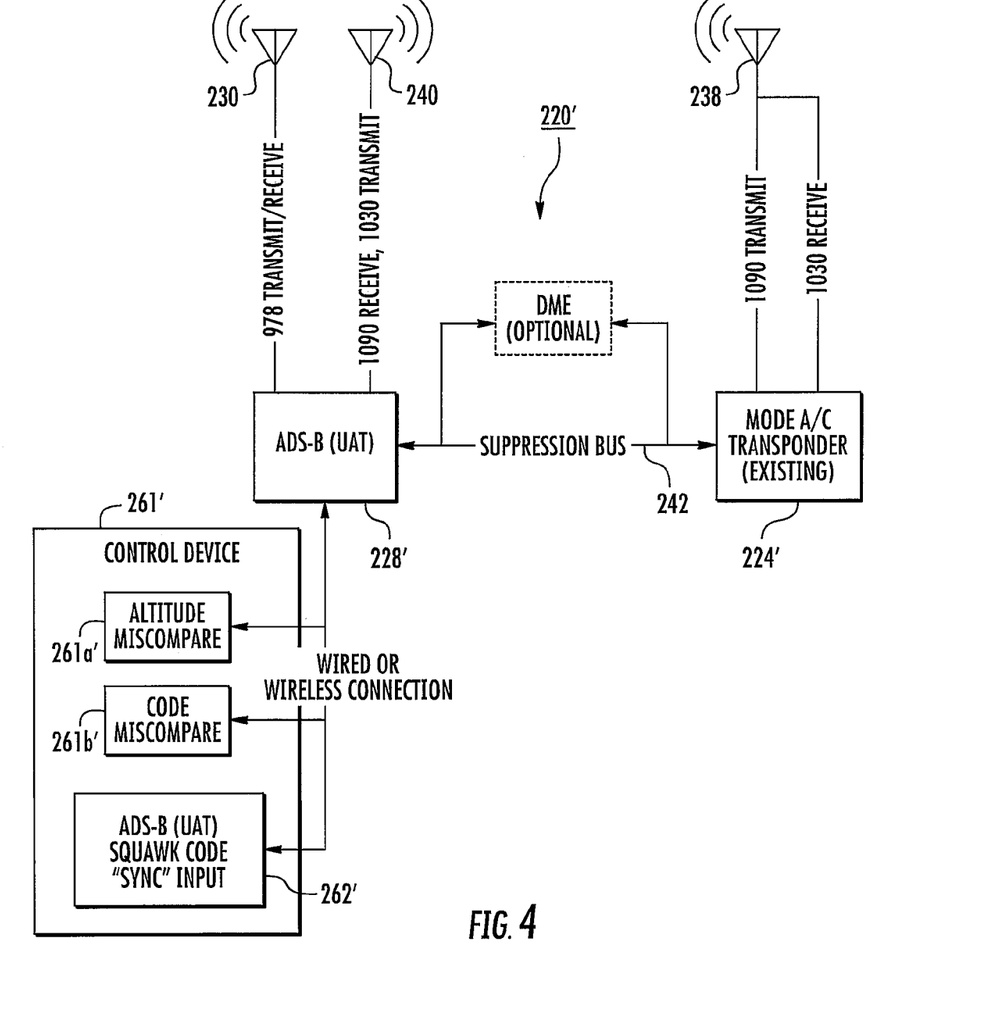
FIG. 4 is the same view as FIG. 1 of an alternative embodiment thereof.
Figure 5:
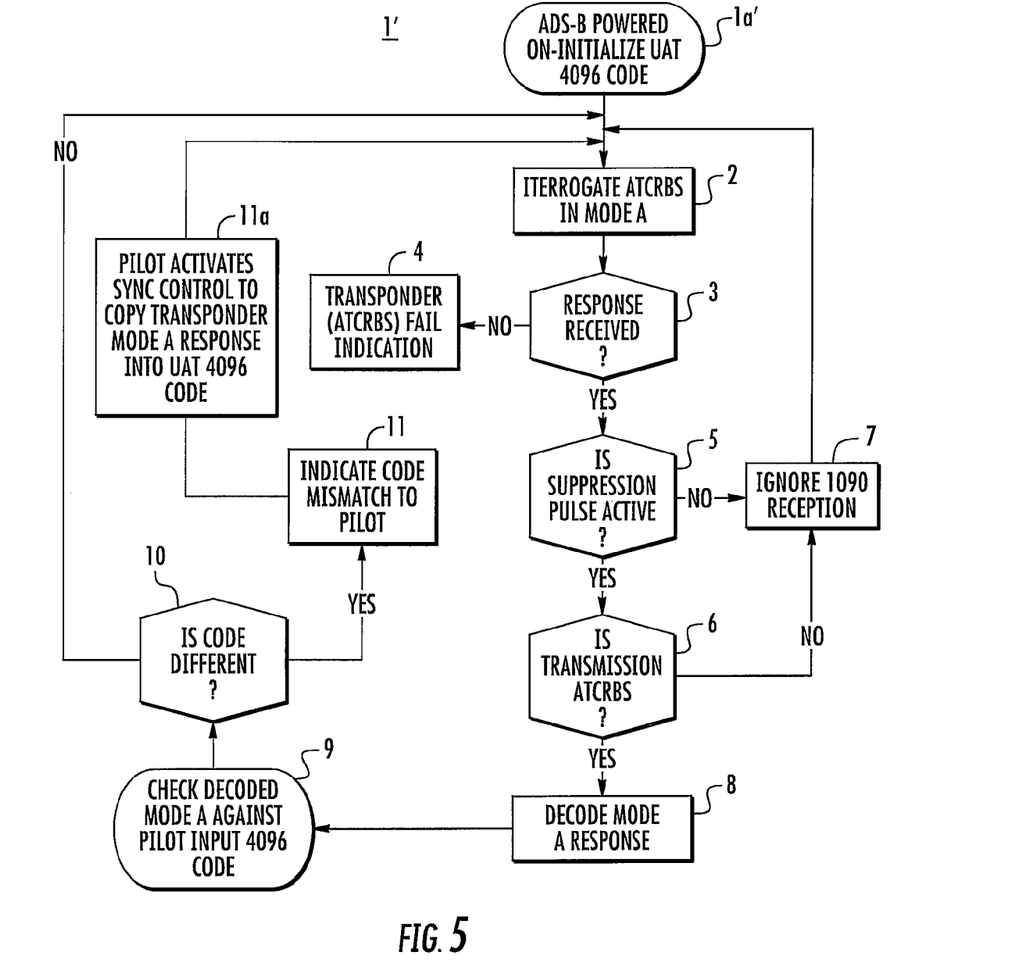
FIG. 5 is the same view as FIG. 2 of an alternative embodiment thereof.

In an alternative embodiment, a system 220' is generally the same as system 220 except that it includes a pilot control panel 261' that includes a code miscompare indicator 261b' and an altitude miscompare indicator 261a' that are the same as code miscompare indicator 261b and altitude miscompare indicator 261a, respectively (FIGS. 4 and 5). However, system 220' includes an sync input 262' that is operable by the pilot to cause the message formatter of ADS-B unit 228' to copy the transponder Squawk code that has been captured form transponder 224'. Thus, if the pilot observes that code miscompare indicator 261' is actuated, sync control 262' can be actuated manually by the pilot to cause ADS-B unit 228' to copy the code of transponder 224'. This should result in the transponder and ADS-B system transmitting the same code which should result in code miscompare indicator 261b' being extinguished.

An advantage of system 262' is that a separate pilot Squawk code entry device is not required in order to enter the Squawk code of ADS-B system 228'. Instead, a single "push to sync" push button could be used. However, a pilot Squawk code entry device for the ADS-B system could be provided, if desired, to have the pilot enter the same code into both the transponder and ADS-B system as previously described. Upon power-up of system 220', ADS-B system 228' may adopt a default Squawk code, the last known Squawk code, or the like. This should result in a mismatch between the Squawk codes of transponder 224' and ADS-B system 228'. However, once the pilot operates sync input 262', the mismatch should disappear.

In operation, referring to FIG. 5, control technique 1' starts at 1a' by ADS-B system 228' being powered. This should result in a Squawk code of a default value, the last used Squawk code, or some other value to be assigned to the ADS-B system. Control technique 1' then performs the same general steps 2 through 11 as with control technique 1. However, if an indication is made to the pilot at 11 that the ADS-B code does not match that of the transponder, the pilot is able to manually actuate sync control 262' at 11a in order to copy the transponder mode A response of transponder 224' into ADS-B system 228'. Upon the next transmission of ADS-B system 228', the Squawk code will match that of transponder 224'.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An Automatic Dependent Surveillance-Broadcast (ADS-B) system for an aircraft comprising:
   a transponder decoder comprising an input adapted to receive a mode A/C transponder transmission from a transponder positioned aboard the aircraft, a decoder adapted to decode the mode A/C transponder transmission and an output for outputting the decoded mode A/C transponder transmission to determine a transponder Squawk code;
   a Squawk code input that is adapted to set an ADS-B Squawk code;
   a message formatter that is adapted to generate a message including the ADS-B Squawk code;
   a comparator that is adapted to compare the transponder Squawk code and the ADS-B Squawk code and to inform the pilot whether the transponder Squawk code and the ADS-B Squawk code are the same; and
   a wireless transmitter in communication with said message formatter, said wireless transmitter adapted to wirelessly broadcast said message including the ADS-B Squawk code.

2. The ADS-B system of claim 1 wherein said Squawk code input comprises a pilot input device.

3. The ADS-B system of claim 1 including a sync control, wherein said sync control is adapted to cause said Squawk code input to set the ADS-B Squawk code to the value of the transponder Squawk code if said comparator determines that the transponder Squawk code and the ADS-B Squawk code are not the same.

4. The ADS-B system in claim 1 wherein said Squawk code input comprises a default ADS-B Squawk code value upon system power-up.

5. The ADS-B system of claim 1 wherein said transponder decoder receives said Squawk code wirelessly from the transponder.

6. The ADS-B system of claim 1 wherein said transponder decoder also receives altitude information broadcast from said transponder and forwards said altitude information to said comparator for comparing the altitude information broadcast from said transponder to altitude information received from another source of altitude information.

7. The ADS-B system of claim 1 wherein said message formatter is adapted to determine that a transponder transmission is a Squawk code.

8. The ADS-B system of claim 7 wherein said message formatter is adapted to determine that a transponder transmission is a Squawk code by determining that the transponder transmission has a value that is not the same value as altitude information for the aircraft.

9. The ADS-B system of claim 7 wherein said message formatter is adapted to take an alternative action if it cannot determine that the transponder transmission is a Squawk code.

10. The ADS-B system of claim 9 wherein the alternative action comprises providing an indication to the pilot.

11. The ADS-B system of claim 9 wherein the alternative action comprises sending an interrogation signal to activate said transponder to send a Squawk code.

12. The ADS-B system of claim 11 wherein said wireless transmitter sends the interrogation signal to said transponder.

13. The ADS-B system of claim 7 wherein said message formatter is adapted to determine that the transponder is not transmitting.

14. The ADS-B system of claim 13 wherein said message formatter is adapted to distinguish between said transponder not transmitting because i) the transponder is not operational or ii) the transponder is not being interrogated.

15. The ADS-B system of claim 1 is adapted to send an interrogation signal to activate said transponder to send a Squawk code.

16. The ADS-B system of claim 15 wherein said wireless transmitter sends the interrogation signal to said transponder.

17. The ADS-B system of claim 16 further including a transponder suppression bus input adapted to be coupled to a transponder suppression bus, said transponder suppression bus input adapted to receive a signal to help differentiate between data transmitted by said transponder onboard the aircraft and data transmitted by any transponders off-board said aircraft.

18. The ADS-B system of claim 16 wherein said wireless transmitter is a component of a Universal Access Transceiver (UAT).

19. The ADS-B system of claim 1 wherein said transponder decoder also receives IDENT information broadcast from said transponder and forwards the IDENT information to said message formatter for formatting into said message.

20. A method of harmonizing a transponder Squawk code and an ADS-B system such that a Squawk code broadcast by the ADS-B system matches the transponder Squawk code, said method comprising:
   transmitting said transponder Squawk code from a transponder positioned onboard an aircraft;
   receiving the transmitted transponder Squawk code with a device positioned onboard the aircraft;
   receiving an ADS-B Squawk code to be transmitted with the ADS-B system;
   comparing the ADS-B Squawk code with the received transmitter Squawk code;
   informing the pilot whether the transmitter Squawk code matches the ADS-B Squawk code; and
   broadcasting the ADS-B Squawk code using the ADS-B system.

21. The method of claim 20 including setting the ADS-B Squawk code with a pilot input device.

22. The method of claim 20 including causing the ADS-B Squawk Code to be set to the transponder Squawk code if said comparing determines that the transponder Squawk code and the ADS-B Squawk code are not the same.

23. The method of claim 20 including receiving a default ADS-B Squawk code value upon system power-up.

24. The method of claim 20 wherein receiving the transmitted transponder Squawk code is performed wirelessly using an antenna.

25. The method of claim 20 further including receiving a signal from a transponder suppression bus and using said signal to help differentiate between data transmitted by said transponder onboard the aircraft and data transmitted by any transponders off-board said aircraft.

26. The method of claim 20 further including receiving altitude information broadcast from said transponder and comparing the altitude information broadcast from said transponder to altitude information received from another source of altitude information.

27. The method of claim 20 including determining that a transponder transmission is a mode A Squawk code.

28. The method of claim 27 wherein said determining that a transponder transmission is a Squawk code includes determining that the transponder transmission has a value that is not the same value as altitude information for the aircraft.

29. The method of claim 27 including taking alternative action if it cannot be determined that the transponder transmission is a Squawk code.

30. The method of claim 29 wherein the alternative action comprises providing an indication to the pilot.

31. The method of claim 29 wherein the alternative action comprises sending an interrogation signal to activate said transponder to send a Squawk code.

32. The method of claim 20 including sending the interrogation signal to said transponder with the ADS-B system.

33. The method of claim 20 including sending an interrogation signal to activate said transponder to send a Squawk code.

34. The method of claim 33 including sending the interrogation signal to said transponder with the ADS-B system.

35. The method of claim 20 including determining that the transponder is not transmitting.

36. The method of claim 35 wherein said determining that the transponder is not transmitting includes distinguishing between said transponder not transmitting because i) the transponder is not operational or ii) the transponder is not being interrogated.

* * * * *